US012183523B2

(12) United States Patent
Seng et al.

(10) Patent No.: US 12,183,523 B2
(45) Date of Patent: Dec. 31, 2024

(54) INSULATED DRIVE VACUUM INTERRUPTER

(71) Applicant: S&C Electric Company, Chicago, IL (US)

(72) Inventors: Nicholas Seng, Chicago, IL (US); Keith W. Benson, Chicago, IL (US); Raphael Guio, Barrington, IL (US); Gregory Wilk, Chicago, IL (US); Jason R. Bogusz, Chicago, IL (US); Kam Wa Cheng, Staffordshire (GB); Ryan Michael Evans, Chicago, IL (US); Leo Caro, Chicago, IL (US); Héctor Román, Evanston, IL (US)

(73) Assignee: S&C Electric Company, Chicago, IL (US)

( * ) Notice: Subject to any disclaimer, the term of this patent is extended or adjusted under 35 U.S.C. 154(b) by 117 days.

(21) Appl. No.: 17/947,483

(22) Filed: Sep. 19, 2022

(65) Prior Publication Data

US 2023/0116363 A1 Apr. 13, 2023

Related U.S. Application Data

(60) Provisional application No. 63/253,353, filed on Oct. 7, 2021.

(51) Int. Cl.
*H01H 33/662* (2006.01)
*H01H 33/664* (2006.01)

(52) U.S. Cl.
CPC ........ *H01H 33/664* (2013.01); *H01H 33/662* (2013.01); *H01H 33/66238* (2013.01)

(58) Field of Classification Search
CPC ............... H01H 33/664; H01H 33/662; H01H 33/66238; H01H 33/66207;
(Continued)

(56) References Cited

U.S. PATENT DOCUMENTS 7,239,490 B2 * 7/2007 Benke ................. H01H 33/666 218/118
7,812,273 B2 * 10/2010 Takahara ............. H01H 33/666 200/293
(Continued)

FOREIGN PATENT DOCUMENTS

WO 201102422 A1 3/2011

OTHER PUBLICATIONS

International Search Report and Written Opinion for International Application No. PCT/US2022/43961 dated Feb. 11, 2023. (11 pages).

*Primary Examiner* — William A Bolton

(57) ABSTRACT

A vacuum interrupter including a vacuum bottle, a fixed contact extending through one end of the vacuum bottle and a movable contact positioned within the vacuum bottle relative to the fixed contact so that a gap is defined between the fixed contact and the movable contact when the vacuum interrupter is open and the fixed contact and the movable contact are in contact with each other when the vacuum interrupter is closed. An insulated drive rod is rigidly coupled to the movable contact opposite to the fixed contact and a circular flexible conductor is coupled to the movable contact and flexes when the movable contact is moved by the drive rod. The flexible conductor can be, for example, a laminate structure including a plurality of stacked conductive laminates each having a plurality of spirals separated by gaps or a linear spring trampoline conductor.

20 Claims, 4 Drawing Sheets

(58) Field of Classification Search
CPC ........... H01H 33/6662; H01H 33/6606; H01H 33/6645; H01H 1/5822; H01H 2001/5827; F04B 45/02
USPC ....... 218/118, 119, 121, 126, 127, 129, 134, 218/135, 138, 139, 146
See application file for complete search history.

(56) References Cited

U.S. PATENT DOCUMENTS

| | | | | |
|---|---|---|---|---|
| 8,089,021 | B2 * | 1/2012 | Kagawa | H01H 33/6606 218/140 |
| 8,110,769 | B2 * | 2/2012 | Bodenstein | H01H 33/664 218/124 |
| 8,115,124 | B2 * | 2/2012 | Maruyama | H01H 33/6606 218/118 |
| 2003/0085200 | A1 * | 5/2003 | Rosenkrans | H01H 33/66261 218/154 |
| 2012/0089202 | A1 * | 4/2012 | Staller | A61N 1/37229 307/104 |
| 2014/0175059 | A1 | 6/2014 | Huang et al. | |
| 2017/0256374 | A1 | 9/2017 | Phillpotts et al. | |
| 2020/0251294 | A1 * | 8/2020 | Rusev | H01F 7/18 |

* cited by examiner

INSULATED DRIVE VACUUM INTERRUPTER

CROSS REFERENCE RELATED TO APPLICATIONS

This application claims the benefit of priority from the U.S. Provisional Application No. 63/253,353, filed on Oct. 7, 2021, the disclosure of which is hereby expressly incorporated herein by reference for all purposes.

BACKGROUND

Field

This disclosure relates generally to a vacuum interrupter and, more particularly, to a vacuum interrupter including a flexible conductor and a vacuum insulated drive rod.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three-phase feeders including three single-phase feeders that carry the same current, but are 120° apart in phase. A number of three-phase and single phase lateral lines are tapped off of the feeder that provide the medium voltage to various distribution transformers, where the voltage is stepped down to a low voltage and is provided to a number of loads, such as homes, businesses, etc.

Power distribution networks of the type referred to above typically include a number of switching devices, breakers, reclosers, current interrupters, etc. that control the flow of power throughout the network. Vacuum interrupters are typically employed in many types of these switching devices to provide load and fault current interruption, where the vacuum interrupter is controlled by a magnetic actuator. A vacuum interrupter typically includes a cylindrical insulator, usually ceramic, and end caps sealed to the ends of the insulator to form a vacuum chamber or bottle. A fixed contact is electrically coupled to and extends through one of the end caps into the vacuum chamber and a movable contact is electrically coupled to and extends through the other end cap into vacuum chamber. When the contacts are in contact with each other current can flow through the vacuum interrupter. When the movable contact is moved away from the fixed contact, a plasma arc is created between the contacts that is quickly extinguished by the vacuum through a zero current crossing. The separated contacts in vacuum provides dielectric strength that exceeds power system voltage and prevents current flow, and the insulator prevents current flow between the end caps outside of the contacts.

The magnetic actuator used in these types of switching devices typically have an armature or plunger that is moved by an electrical winding wound on a stator to open and close the vacuum interrupter contacts, where the plunger and the stator provide a magnetic path for the magnetic flux produced by the winding, and where the plunger is rigidly fixed to the movable contact by a drive rod. In one design, when the actuator is controlled to close the vacuum interrupter, the winding is energized by current flow in one direction, which causes the plunger to move and seat against a latching plate. The current is then turned off to de-energize the coil and permanent magnets hold the plunger against the latching plate and against a compression force of an opening spring. When the actuator is controlled to open the vacuum interrupter, the winding is energized by current flow in the opposite direction, which breaks the latching force of the permanent magnets and allows the opening spring to open the vacuum interrupter. A compliance spring is provided in addition to the opening spring to provide an additional opening force at the beginning of the opening process so as to break the weld on the interrupter contacts.

The vacuum interrupter operates at system potential and the magnetic actuator usually operates at ground potential. The drive rod, typically a fiberglass rod, connecting the plunger to the movable contact extends through air and thus must be long enough to prevent arcing between the vacuum interrupter at relatively high voltage and the grounded actuator. However, the assemblies for these drive rods are heavy, expensive and add length to the switching device, all of which are generally undesirable. Further, the size of the drive rod significantly increases the mass that needs to be moved during the switching operation.

SUMMARY

The following discussion discloses and describes a vacuum interrupter including an insulator having a first insulator portion and a second insulator portion, a first end cap sealed to one end of the first insulator portion, a second end cap sealed to one end of the second insulator portion, and a current ring sealed to an end of the first insulator portion opposite to the first end cap and sealed to an end of the second insulator portion opposite to the second end cap, where the first insulator portion, the second insulator portion, the first end cap, the second end cap and the current ring define a sealed vacuum chamber. The vacuum interrupter further includes a fixed contact extending through the first end cap and into the chamber and being sealed thereto, a movable contact positioned within the chamber relative to the fixed contact so that a gap is defined between the fixed contact and the movable contact when the vacuum interrupter is open and the fixed contact and the movable contact are in contact with each other when the vacuum interrupter is closed. The vacuum interrupter also includes a bellows sealed to the second end cap, an insulated drive rod rigidly coupled to the movable contact opposite to the fixed contact and the bellows, and a flexible conductor coupled to the movable contact and the current ring, where the flexible conductor flexes when the movable contact is moved by the drive rod so as to maintain an electrical connection between the movable contact and the current ring. In one embodiment, the flexible conductor includes a plurality of circular laminates stacked on top of each other and including a plurality of spirals defining gaps therebetween. In another embodiment, the flexible conductor is a linear spring trampoline conductor including an inner ring and an outer ring attached by springs.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a vacuum interrupter including a flexible conductor and a vacuum insulated drive rod is merely exemplary in nature, and is in no way intended to limit the disclosure or its applications or uses. For example, the discussion herein refers to the vacuum interrupter being used in a magnetically actuated fault interrupting device for use in medium voltage power distribution networks. However, as will be appreciated by those skilled in the art, the vacuum interrupter will have other applications.

Figure 1:
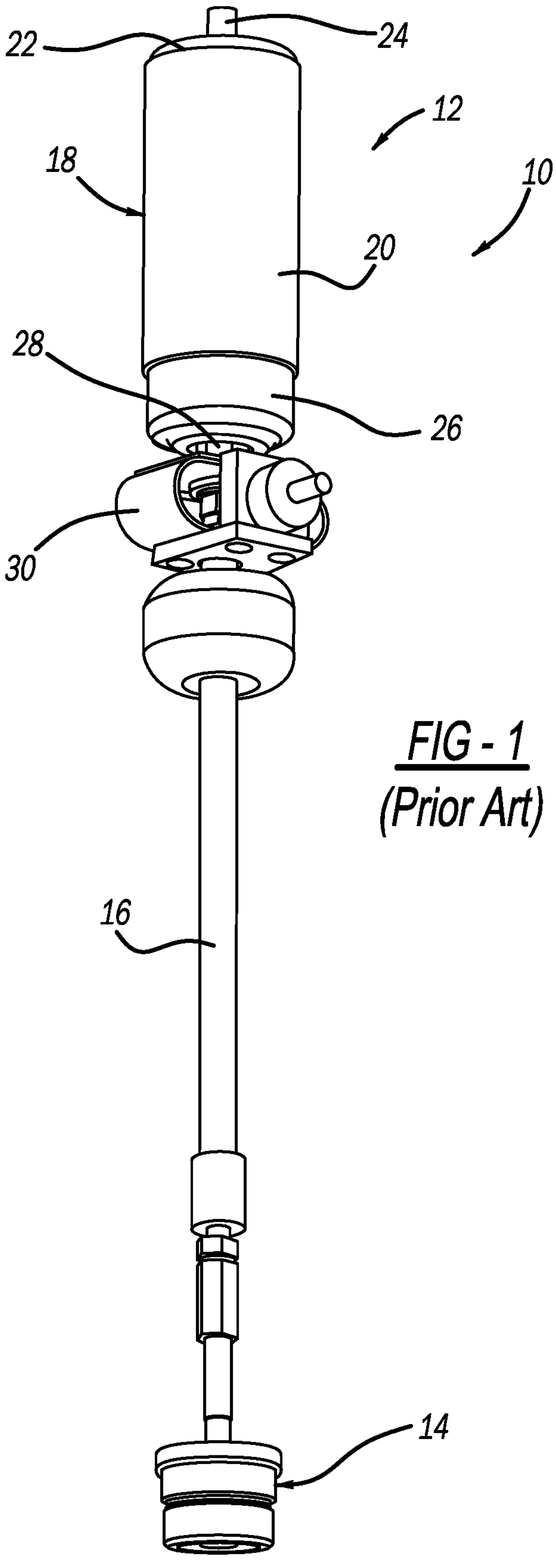
FIG - 1 (Prior Art)
FIG. 1 is an isometric view of a portion of a known magnetically actuated switch assembly including a vacuum interrupter coupled to a magnetic actuator by an air insulated drive rod.

FIG. 1 is an isometric view of a portion of a known magnetically actuated switch assembly 10 of the type discussed above, where the switch assembly 10 has particular application for use in a magnetically actuated fault interrupting device for use in a medium voltage power distribution network. The assembly 10 includes a vacuum interrupter 12 coupled to a magnetic actuator 14 that opens and closes the vacuum interrupter 12 by actuating an air insulated drive rod 16. The vacuum interrupter 12 includes a vacuum bottle 18 having a cylindrical ceramic insulator 20, a top end cap 22 coupled to one end of the insulator 20 out of which a fixed contact 24 extends and a bottom end cap 26 coupled to the other end of the insulator 20 out of which a movable contact 28 extends. The movable contact 28 is coupled to a flexible connector 30 that flexes when the drive rod 16 is actuated by the actuator 14 to move the movable contact 28 against and away from the fixed contact 24. As is apparent, the drive rod 16 has considerable length required to prevent arcing between the connector 30 at system potential and the actuator 14 at ground potential.

Figure 2:
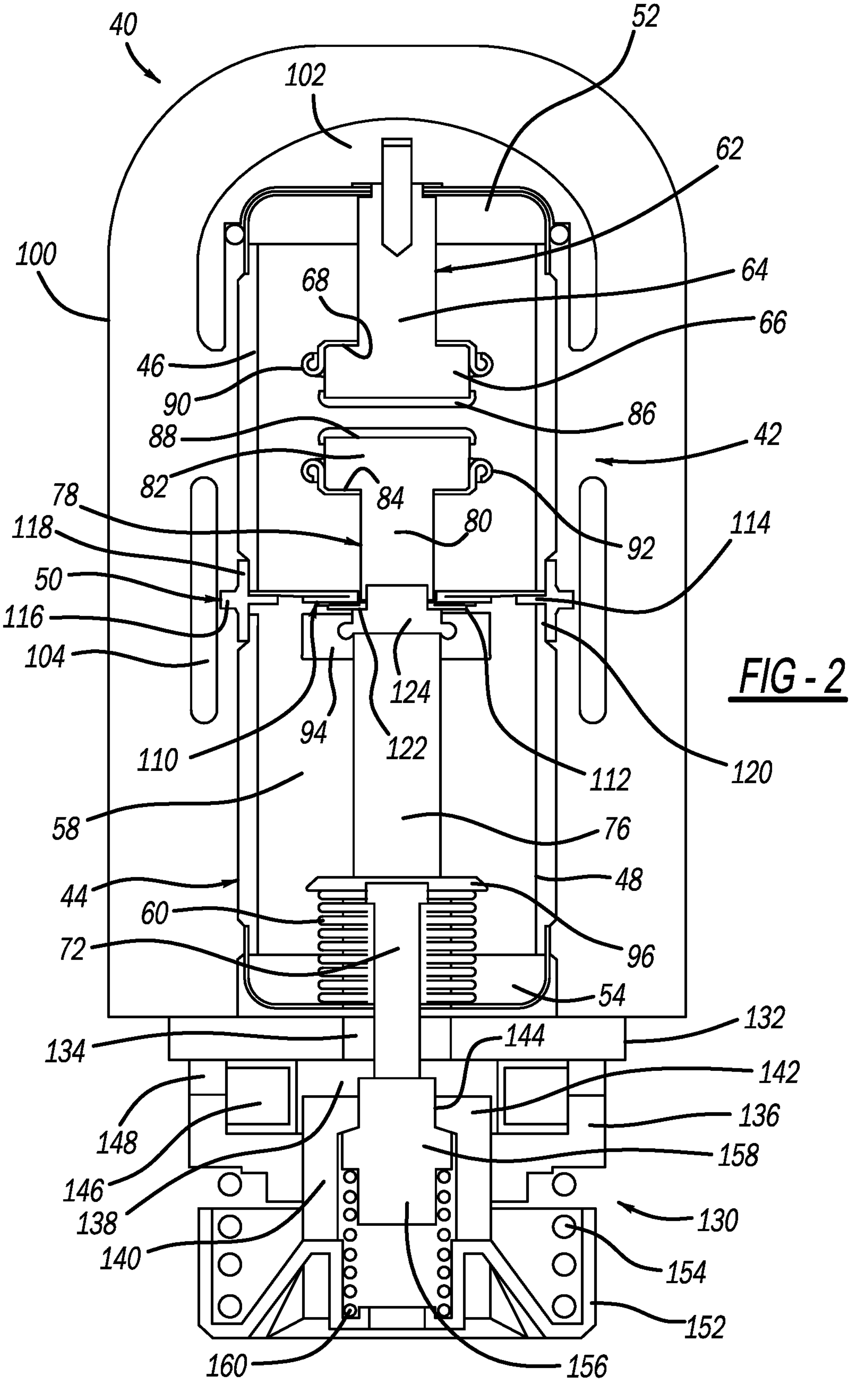
FIG. 2 is a cross-sectional type view of a magnetically actuated switch assembly including a vacuum interrupter having an insulated drive rod and a flexible conductor including a series of spiral laminates.
Figure 3:
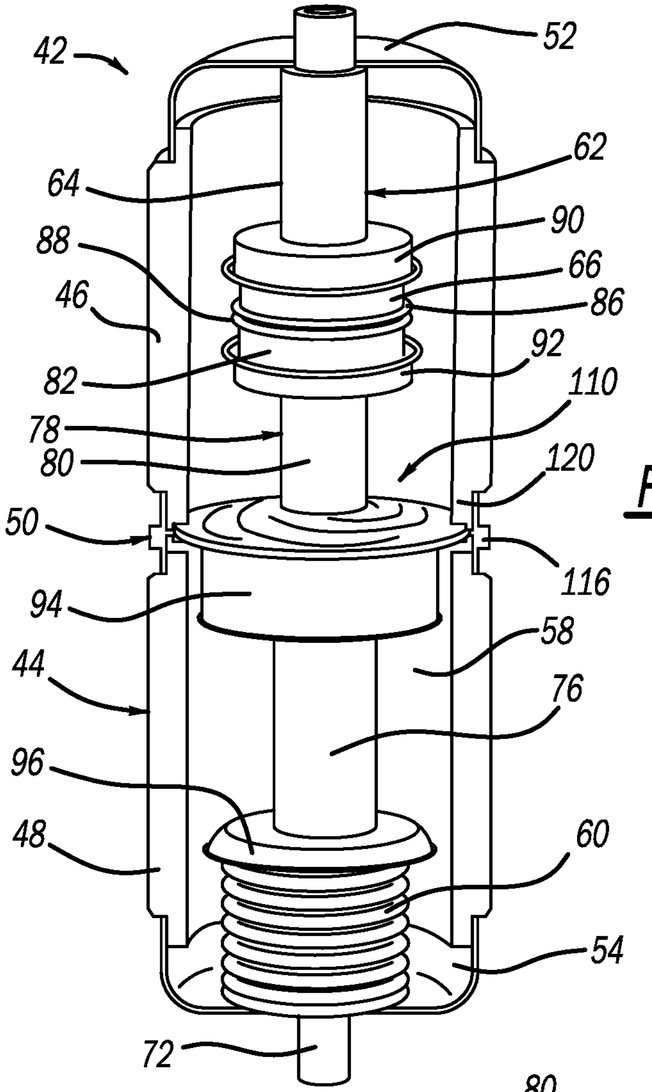
FIG. 3 is a broken-away isometric view of the vacuum interrupter separated from the switch assembly shown in FIG. 2.

FIG. 2 is a cross-sectional view of a magnetic actuated switch assembly 40 including a vacuum interrupter 42 and FIG. 3 is a broken-away isometric view of the vacuum interrupter 42 separated from the switch assembly 40. The vacuum interrupter 42 includes a cylindrical ceramic insulator 44 having an upper portion 46 and a lower portion 48 separated by a current transfer ring 50. A top metallic end cap 52 is coupled to the upper portion 46 and a bottom metallic end cap 54 is coupled to the lower portion 48, where the upper portion 46, the lower portion 48, the ring 50 and the end caps 52 and 54 are all sealed together typically by brazing or the like to define a vacuum chamber 58. A metallic bellows 60 is electrically coupled to the end cap 54 and is positioned within the chamber 58. A fixed contact stem 62 is electrically coupled and sealed to the end cap 52 and extends through the end cap 52 into the chamber 58, where the stem 62 includes a shaft portion 64 and a cup portion 66 defining a shoulder 68 therebetween.

A coupling rod 72 extends from the vacuum interrupter 42 through the end cap 54 and is sealed to the bellows 60, where the bellows 60 maintains the vacuum within the chamber 58 when the rod 72 moves. A ceramic drive rod 76 is fixed to the coupling rod 72 in the chamber 58 at one end and to a movable contact stem 78 at an opposite end in the chamber 58, where the stem 78 includes a shaft portion 80 and a cup portion 82 defining a shoulder 84 therebetween. An arcing contact 86 is electrically secured to the cup portion 66 and an arcing contact 88 is electrically secured to the cup portion 82 so that a gap is defined therebetween when the vacuum interrupter 42 is open. Vapor shields 90 and 92 are secured to the shoulders 68 and 84, respectively, and are provided around the cup portions 66 and 82, respectively, that help prevent metal vapor emitted from the contacts 86 and 88 when the plasma arc occurs when the contacts 86 and 88 are separated from condensing on an inside surface of the insulator 44, which would otherwise create a conductive metal coating on the inside surface of the insulator 44, and thus provide a conduction path in parallel with the contacts 86 and 88. A cup-shaped vapor shield 94 protects the drive rod 76 from the vapor and a cup-shaped vapor shield 96 protects the bellows 60 from the vapor.

The conductive path between the current ring 50 at system voltage and the end cap 54 at ground potential outside of the insulator 44 is still through air. Therefore, an outer insulating housing 100, such as an epoxy enclosure, encloses the insulator 44 for this purpose. Shielding conductors 102 and 104 are provided within the housing 100 to reduce electric field stress points at various locations in the vacuum interrupter 42. When in use, a power line (not shown) will be connected to the stem 62 opposite to the arcing contact 86 and a power line (not shown) will be connected to the current transfer ring 50.

Figure 4:
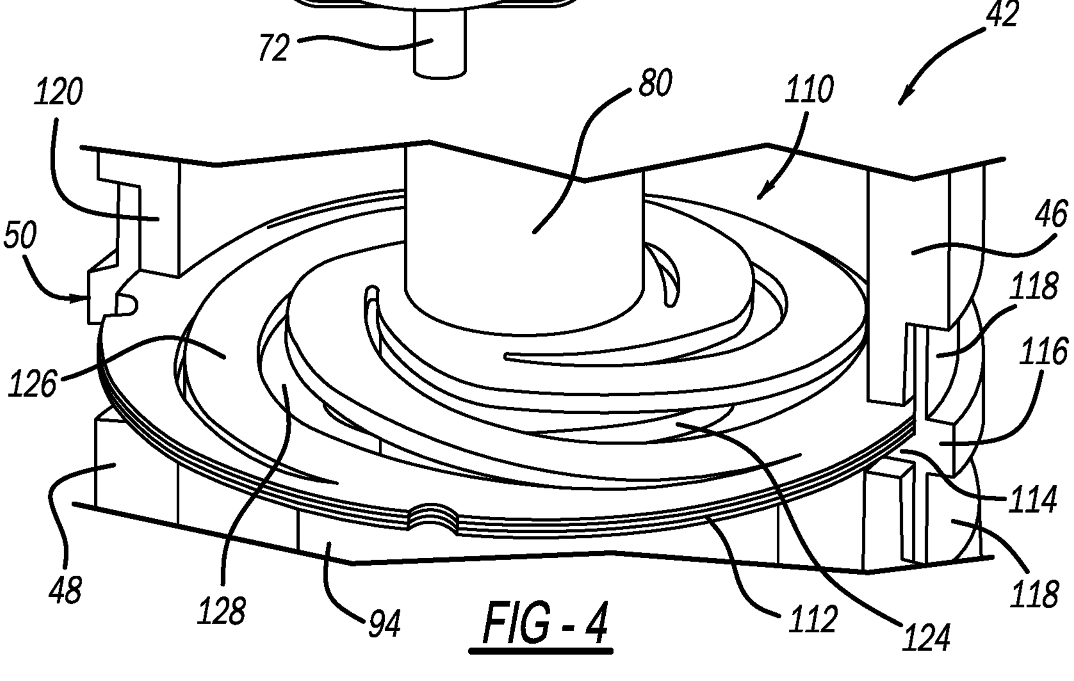
FIG. 4 is another broken-away isometric view of the vacuum interrupter separated from the switch assembly shown in FIG. 2.

A flexible conductor 110 including a series of spiral laminates 112 stacked on top of each other is electrically coupled to the stem 78 opposite to the arcing contact 86 and the current transfer ring 50, thus making an electrical connection between the power lines when the vacuum interrupter 42 is closed. FIG. 4 is a broken-away isometric view of the vacuum interrupter 42 better illustrating the flexible conductor 110. The current ring 50 includes an inner flange 114, an outer flange 116 that allows electrical connection to be made to the ring 50 and a plate portion 118 that allows the ring 50 to be sealed to opposing flanges 120 extending from the upper and lower portions 46 and 48. An outer edge of the conductor 110 is positioned between the opposing flanges 120 and is coupled and may be brazed to the ring 50 to make an electrical connection thereto. An inner edge of the conductor 110 is coupled and may be brazed to a shoulder 122 defined by a support piece 124 formed to the rod 76 to make electrically contact thereto. The laminates 112 include a series of spiral arms 126, here four, defining spaces 128 therebetween, where the spiral arms 126 maximize the current transfer between the stem 78 and the current ring 50 while providing high flexibility. The laminates 112 are very thin, for example, less than 0.020 inches thick, such as 0.005 inches thick, to be highly flexible. The number of the laminates 112 is selected for a particular application and power rating of the vacuum interrupter 42 and generally will be between six and twenty of the laminates 112.

The switch assembly 40 also includes an actuator 130 that controls the drive rod 76 to open and close the vacuum interrupter 42. The actuator 130 includes an annular latching plate 132 having a central opening 134 through which the coupling rod 72 extends. The actuator 130 also includes a stator 136 defining a central opening 138, where a magnetic plunger 140 having a top shoulder 142 defining an opening 144 is slidably positioned within the opening 138. A coil 146 is positioned against the stator 136 in the opening 138 and a series of permanent magnets 148 are positioned between the plate 132 and the stator 136. A cup member 152 is rigidly secured to the plunger 140 and an opening spring 154 is provided within the cup member 152 and is positioned against the stator 136. A stop member 156 including an annular flange 158 is provided within the plunger 140 and is rigidly attached to the coupling rod 72 through the opening 144 in the plunger 140. A compliance spring 160 is provided within the cup member 152 and is positioned against the flange 158, which pushes the flange 158 against the shoulder 142.

The vacuum interrupter 42 is shown in the open position in FIG. 2 where the flexible conductor 110 is cupped downward and in the closed position in FIG. 3 where the flexible conductor 110 is cupped upward. When the vacuum interrupter 42 is to be closed from the open position, the coil 146 is energized with current flow in one direction, which draws the plunger 140 and the cup member 152 upward against the bias of the opening spring 154 and the compliance spring 160. The bias of the compliance spring 160 pushes the stop member 156, the coupling rod 72 and the drive rod 76 upward, which causes the plunger 140 to seat against the latching plate 132 and the movable contact stem 78 to close the gap between the arcing contacts 86 and 88 and close the vacuum interrupter 42. As this is occurring the flexible conductor 110 flexes and maintains the electrical connection between the stem 78 and the current ring 50. The current to the coil 146 is turned off, and the permanent magnets 158 hold the plunger 140 in the closed position. When the vacuum interrupter 12 is to be opened from the closed position, the coil 146 is energized in the opposite direction, which forces the plunger 140 down and breaks the magnetic hold of the permanent magnets 148. The opening spring 154 and the compliance spring 160 provide the force to open the contacts 86 and 88 against the welding force on the contacts 86 and 88.

Figure 5:
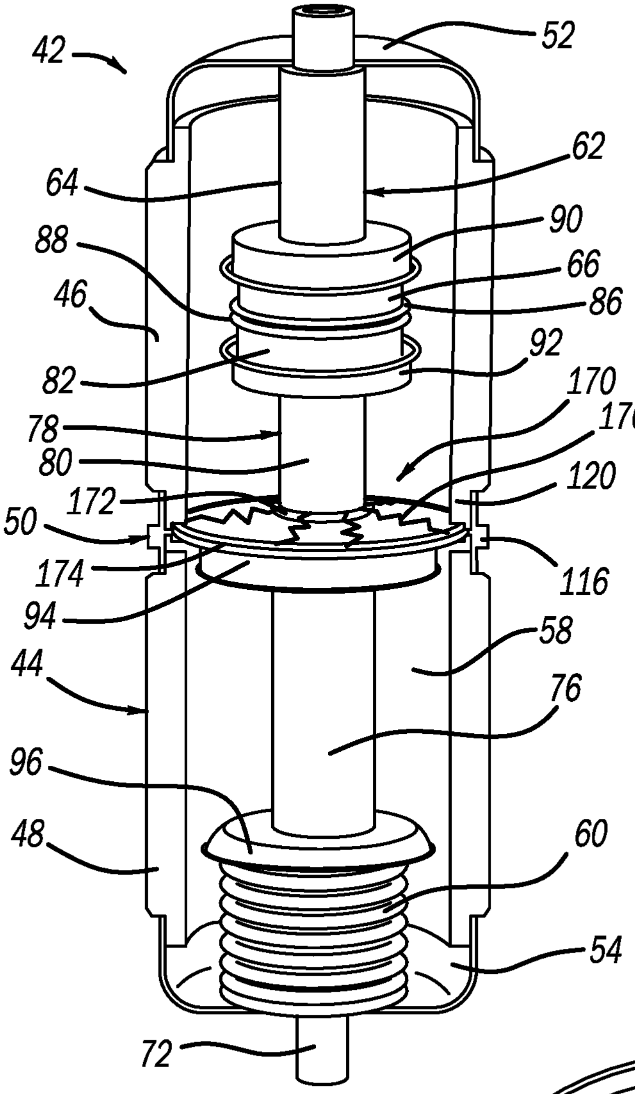
FIG. 5 is a broken-away isometric view of the vacuum interrupter shown in FIG. 2, where the flexible conductor has been replaced with a linear spring trampoline conductor.
Figure 6:
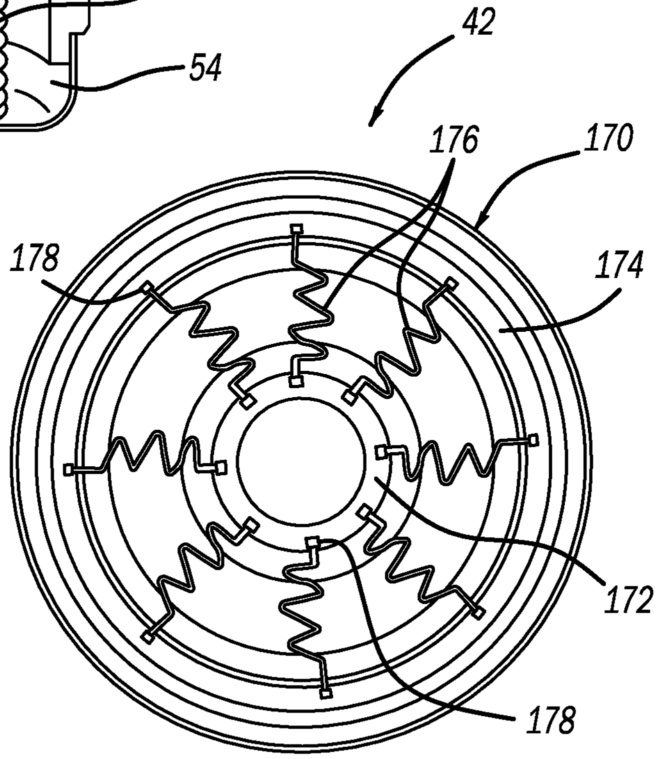
FIG. 6 is a cross-sectional type top view of the vacuum interrupter showing the trampoline conductor.

The flexible conductor 110 provides one suitable embodiment for transferring current in the vacuum interrupter 42, as described. However, other designs may also be applicable and may have better results in reducing high stress points in the conductor, which could reduce ripping and tearing in the conductor. FIG. 5 is a broken-away isometric view of the vacuum interrupter 42, where the flexible conductor 110 has been replaced with a flexible linear spring trampoline conductor 170. FIG. 6 is a cross-sectional type top view of the vacuum interrupter 42 showing the trampoline conductor 170. As with the conductor 110, the conductor 170 is electrically coupled to the stem 78 opposite to the arcing contact 86 and the current transfer ring 50, thus making an electrical connection between the power lines when the vacuum interrupter 42 is closed, where the conductor 170 is cupped upward when the vacuum interrupter 42 is closed and is cupped downward when the vacuum interrupter 42 is open. The trampoline conductor 170 includes an inner ring 172 that is coupled and may be brazed to the support piece 124 to make an electrical connection thereto. The trampoline conductor 170 also includes an outer ring 174 having an edge that is positioned between the opposing flanges 120 and is coupled and may be brazed to the ring 50 to make an electrical connection thereto, where a space is provided between the rings 172 and 174.

A series of spaced apart coiled springs 176, here eight, are electrically coupled to the rings 172 and 174 to provide the necessary electrical connection between the rings 172 and 174 and provide the necessary flexibility of the conductor 170. In one embodiment, tabs 178 are provided where the springs 176 are connected to the rings 172 and 174 to reduce mechanical stresses at the connection point. In one non-limiting embodiment, the rings 172 and 174 and the springs 176 are oxygen free copper and ends of the springs 176 are laser welded to the rings 172 and 174 at the tabs 178. The number of the springs 176 is dependent on the current magnitude and the cross-sectional area of the wires that the springs 176 are made of. Minimizing mechanical stress in the copper of the springs 176 may also include maximizing the length of the springs 176 by reducing the width of the rings 172 and 174. By using a copper coil spring, the length of the copper wire can more easily be increased by increasing the number of the coils or the diameter of coils. Specific embodiments include six 11-AWG wire springs, five 10-AWG wire springs or four 9-AWG wire springs based on the material of oxygen free copper and its resistance.

The conductive material used for the conductor 170 is limited because of outgassing in the vacuum environment and other limitations. Oxygen free copper has been suggested above as one suitable material, however, that material is soft and deforms easily. Other materials may also be applicable, such as copper chromium zirconium (CCZ).

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A vacuum interrupter comprising:

an insulator including a first insulator portion and a second insulator portion;

a first end cap sealed to one end of the first insulator portion;

a second end cap sealed to one end of the second insulator portion;

a current ring sealed to an end of the first insulator portion opposite to the first end cap and sealed to an end of the second insulator portion opposite to the second end cap, wherein the first insulator portion, the second insulator portion, the first end cap, the second end cap and the current ring define a sealed vacuum chamber and the current ring provides a current transfer path between the sealed vacuum chamber and the exterior of the vacuum interrupter;

a fixed contact extending through the first end cap and into the chamber and being sealed thereto;

a movable contact positioned within the chamber relative to the fixed contact so that a gap is defined between the fixed contact and the movable contact when the vacuum interrupter is open and the fixed contact and the movable contact are in contact with each other when the vacuum interrupter is closed;
- a bellows sealed to the second end cap;
- an insulated drive rod rigidly coupled to the movable contact opposite to the fixed contact and the bellows; and
- a flexible conductor coupled to the movable contact and the current ring, said flexible conductor flexing when the movable contact is moved by the drive rod so as to maintain an electrical connection between the movable contact and the current ring.

2. The vacuum interrupter according to claim 1 wherein the flexible conductor is circular.

3. The vacuum interrupter according to claim 2 wherein the flexible conductor is a laminate structure including a plurality of stacked conductive laminates.

4. The vacuum interrupter according to claim 3 wherein each laminate includes a plurality of spiral arms separated by gaps.

5. The vacuum interrupter according to claim 4 wherein the plurality of spiral arms is four spiral arms.

6. The vacuum interrupter according to claim 3 wherein the number of laminates is from six to twenty laminates.

7. The vacuum interrupter according to claim 3 wherein each laminate is less than 0.020 inches thick.

8. The vacuum interrupter according to claim 7 wherein each laminate is about 0.005 inches thick.

9. The vacuum interrupter according to claim 2 wherein the flexible conductor includes an inner ring coupled to the movable contact, an outer ring coupled to the current ring and being spaced apart from the inner ring and a plurality of springs extending across the space between the inner and outer rings and being electrically coupled thereto.

10. The vacuum interrupter according to claim 9 wherein the plurality of springs are coiled springs.

11. The vacuum interrupter according to claim 9 wherein the plurality of springs is from four to eight springs.

12. The vacuum interrupter according to claim 1 wherein the flexible conductor is made of oxygen free copper or a copper alloy.

13. The vacuum interrupter according to claim 1 wherein the drive rod is a ceramic drive rod.

14. A vacuum interrupter comprising:
- a vacuum bottle;
- a fixed contact extending through one end of the vacuum bottle;
- a movable contact positioned within the vacuum bottle relative to the fixed contact so that a gap is defined between the fixed contact and the movable contact when the vacuum interrupter is open and the fixed contact and the movable contact are in contact with each other when the vacuum interrupter is closed;
- an insulated drive rod rigidly coupled to the movable contact opposite to the fixed contact; and
- a circular flexible conductor coupled to the movable contact and flexing when the movable contact is moved by the drive rod, wherein the flexible conductor is a laminate structure including a plurality of stacked conductive laminates each having a plurality of spiral arms separated by gaps.

15. The vacuum interrupter according to claim 14 wherein the plurality of spiral arms is four spiral arms and the number of laminates is from six to twenty laminates.

16. A vacuum interrupter comprising:
- a vacuum bottle;
- a fixed contact extending through one end of the vacuum bottle;
- a movable contact positioned within the vacuum bottle relative to the fixed contact so that a gap is defined between the fixed contact and the movable contact when the vacuum interrupter is open and the fixed contact and the movable contact are in contact with each other when the vacuum interrupter is closed;
- an insulated drive rod rigidly coupled to the movable contact opposite to the fixed contact; and
- a circular flexible conductor coupled to the movable contact and flexing when the movable contact is moved by the drive rod, wherein the flexible conductor includes an inner ring coupled to the movable contact, an outer ring spaced apart from the inner ring and a plurality of springs extending across the space between the inner and outer rings and being electrically coupled thereto.

17. The vacuum interrupter according to claim 16 wherein the plurality of springs are coiled springs and the number of springs is from four to eight springs.

18. A switch assembly comprising:
- a vacuum interrupter including an insulator having a first insulator portion and a second insulator portion, a first end cap sealed to one end of the first insulator portion, a second end cap sealed to one end of the second insulator portion, and a current ring sealed to an end of the first insulator portion opposite to the first end cap and sealed to an end of the second insulator portion opposite to the second end cap, wherein the first insulator portion, the second insulator portion, the first end cap, the second end cap and the current ring define a sealed vacuum chamber and the current ring provides a path for current transfer between the interior and exterior of the vacuum interrupter, said vacuum interrupter further including a fixed contact extending through the first end cap and into the chamber and being sealed thereto, a movable contact positioned within the chamber relative to the fixed contact so that a gap is defined between the fixed contact and the movable contact when the vacuum interrupter is open and the fixed contact and the movable contact are in contact with each other when the vacuum interrupter is closed, a bellows sealed to the second end cap, an insulated drive rod rigidly coupled to the movable contact opposite to the fixed contact and the bellows, and a flexible conductor coupled to the movable contact and the current ring, said flexible conductor flexing when the movable contact is moved by the drive rod so as to maintain and electrical connection between the movable contact and the current ring; and
- a magnetic actuator including a stator, a plunger and a coil, said plunger being coupled to the drive rod, said coil being energized to move the plunger and open and close the vacuum interrupter.

19. The switch assembly according to claim 18 wherein the flexible conductor includes a plurality of circular laminates stacked on top of each other and including a plurality of spiral arms defining gaps therebetween.

20. The switch assembly according to claim 18 wherein the flexible conductor includes an inner ring coupled to the movable contact, an outer ring coupled to the current ring and being spaced apart from the inner ring and a plurality of springs extending across the space between the inner and outer rings and being electrically coupled thereto.

* * * * *